Patented Dec. 17, 1946

2,412,561

UNITED STATES PATENT OFFICE 2,412,561

CONCENTRATION OF FAT-SOLUBLE VITAMINS

Loran Old Buxton, East Orange, N. J., assignor to National Oil Products Company, Harrison, N. J., a corporation of New Jersey No Drawing. Application August 4, 1942, Serial No. 453,560

10 Claims. (Cl. 167—81)

This invention relates in general to the production of fat-soluble vitamin concentrates and in particular to a process of producing highly potent concentrates of vitamin A.

Fat-soluble vitamin concentrates are being produced at the present time by many different processes, the basic principle of the most common commercial procedures involving the complete saponification of the saponifiable matter in a fat-soluble vitamin containing oil and the recovery of the unsaponifiable matter from the resulting soaps. Many attempts have been made and proposals offered to improve the foregoing saponification processes with a view toward increasing the potency of the ultimate concentrate. One such process involves the extraction of the original oil with ethanol at room temperature and the subsequent saponification of the ethanol extracted fraction. The latter process and many others which have been proposed, including high vacuum distillation, have fallen short in providing highly potent concentrates of vitamin A.

It is the object of this invention to provide an improved process for producing concentrates of fat-soluble vitamins.

Another object of the invention is to provide an improved process for producing concentrates of vitamin A.

Another object of the invention is to provide highly potent concentrates of vitamin A.

Other objects of the invention will in part be obvious and will in part appear hereinafter.

I have discovered that the above and other objects of the invention may be realized by extracting a fat-soluble vitamin-containing marine oil with a solvent which is characterized by being miscible with the oil at temperatures above room temperature and partially immiscible therewith at temperatures below room temperature, saponifying the solvent-extracted fraction and recovering the unsaponified matter from the resulting soaps. Preferably several extractions of the fat-soluble vitamin-containing marine oil are carried out and the resulting extracted fractions each saponified separately or any two or more of these fractions combined and then saponified. In any case the resulting unsaponifiable matter obtained from any fraction or combination thereof will have a higher vitamin A potency than the unsaponifiable matter produced directly from the original oil by saponification alone.

The invention accordingly comprises the several steps and the relation of one or more of such steps with respect to each of the others thereof, which will be exemplified in the method hereinafter disclosed, and the scope of the invention will be indicated in the claims.

The first basic step of the process involves the extraction of the original oil with a particular class of solvents hereinafter described. The solvent employed in accordance with the process of the invention may be selected from a large number of aliphatic solvents found to be useful as a result of extensive experimentation; the choice of the solvent will depend to some extent upon the properties of the oil to be treated, as will become more evident from the detailed description hereinafter given. Results have indicated that the solvents preferably employed are members of well recognized chemical classes; it has also been found that the number of carbon atoms in the solvent to be used is a particularly important factor in determining the availability thereof for use in the practice of this invention. The following table sets forth the classes of solvents which have been found to be particularly useful in the practice of this invention:

Table I

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

Solvents falling in the classes above listed are all liquid aliphatic organic compounds characterized by being miscible with fat-soluble vitamin-containing marine oils at temperatures above room temperature, i. e. 20° to 25° C., and partially immiscible therewith at temperatures below room temperature, and it has been found that solvents falling within these classes of compounds may be used in the practice of this invention. In addition it will be noted that the preferred solvents possess relatively low freezing points.

In order to more fully illustrate the nature of the solvents which may be employed, a partial list thereof is given herewith; it is to be understood, however, that this list is not intended to be complete, but is merely illustrative of the solvents which may be employed. Thus it has been found that the following solvents may be used: n-propyl alcohol, isopropyl alcohol, isopropylamine, n-butyl alcohol, n-amyl alcohol, isoamyl alcohol, secondary amyl alcohol, furfuryl alcohol, allyl alcohol, diacetone alcohol, β-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural, propionaldehyde, crotonaldehyde, acetone, methyl ethyl ketone, acetonyl acetone and propylene chlorhydrin. Mixtures of these solvents may also be used. It will be noted that all these solvents belong to that class of aliphatic organic compounds which has the property of being miscible with fat-soluble vitamin-containing marine oils at temperatures above room temperature and partially immiscible therewith at temperatures below room temperature; furthermore, it will be noted that the majority of these solvents have relatively low freezing points.

Occasionally it may be found that certain of the solvents hereinabove mentioned may be too miscible with some of the oils which may be treated by this invention to effect a separation of highly potent vitamin fractions therefrom; thus, for example, acetone is too miscible with some fat-soluble vitamin-containing oil to accomplish the purposes of this invention. However, this condition can be easily corrected by diluting the solvent either with a small amount of water or with a liquid aliphatic organic solvent relatively immiscible with fatty oils. In general it may be said that the effect of diluting any of the above solvents with water will be to render the solvents more immiscible with fatty oils, so that if difficulty is encountered in effecting proper separation of the highly potent extracts from the vitamin-containing oils, this difficulty can generally be overcome by the addition of a small amount of water to the solvent.

The solvents preferably employed in the practice of the invention are the aliphatic alcohols containing from 3 to 6 carbon atoms; of these solvents isopropanol and diacetone alcohol have proved to be the most successful. The presence of the hydroxyl group seems to impart to these solvents properties which make them particularly useful for the present purposes; whether this factor is due to some activating influence possessed by this group is not known, but it is believed that the presence of the hydroxyl group in such solvents makes them more capable of extracting vitamin A esters from oils containing such esters.

In carrying out the process of the invention the fat-soluble vitamin-containing marine oil to be treated is first mixed with any particular solvent of the aforementioned type. The oil treated may be any of the marine oils containing vitamin A with or without vitamin D, such as, for example, cod liver oil, shark liver oil, tuna liver oil, halibut liver oil, mackerel liver oil, ling cod liver oil, sole liver oil, spear fish liver oil, sword fish liver oil, sardine oil, herring oil, menhaden oil, whale liver oil, etc. The relative proportion of oil to solvent in the mixture may vary widely; preferably the ratio of solvent to oil should be greater than one and in most cases mixtures containing between about 2% and about 25% oil are most suitable. This mixture may then be heated until the oil or the greater part thereof is dissolved in the solvent. The temperature to which the mixture of oil and solvent is heated may vary widely depending upon the nature of the ingredients contained in the mixture; in general it may be stated that it is inadvisable to heat fat-soluble vitamin-containing oils to temperatures in excess of 175° C. because of the relative instability of vitamin A at temperatures above this value. It is preferred to form the solution of oil in the solvent by first heating the solvent to be used to a predetermined temperature at which the oil to be added will substantially completely dissolve in the solvent, and then adding the oil to the solvent with agitation, the operation being carried out in an inert gas atmosphere.

The solution of the vitamin-containing oil in the solvent prepared as hereinabove described may then, in accordance with the process of the invention, be permitted to cool so as to effect a separation of the solution of the highly potent vitamin extract from the remainder of the oil. The temperature to which the solution is cooled may vary from about room temperature to as low as —70° C. or lower. It has been found, however, that it is preferable to cool the solution with agitation to temperatures somewhat below about 0° C., e. g. in the neighborhood of —18° C. Upon cooling, the solution separates into two layers, one layer composed chiefly of the portion of the original oil insoluble in the solvent at low temperatures and the other layer composed of the solvent solution of a highly potent vitamin fraction.

The solvent layer obtained upon cooling the solution may be filtered and then treated to remove the solvent therefrom, e. g. by vacuum distillation, whereby an oil is recovered having a vitamin potency far in excess of that of the original oil; the percentage increase in vitamin potency may be anywhere between about 50% and about 400%. If desired, the solvent extraction may be carried out by continuously contacting a body of a fat-soluble vitamin-containing oil with one of the above solvents at a relatively low temperature, e. g. around —18° C.; this method of operation effects a continuous extraction of a highly potent vitamin fraction from the oil.

In most cases at least 2 extractions of the fat-soluble vitamin-containing oil should be made, and 3 to 6 more extractions are preferably made. The first extract which is obtained is preferably saponified and the vitamins recovered therefrom separately from the other extracts. The second and subsequent extracts may either be combined and then saponified and the vitamin concentrate recovered therefrom or each extract may be saponified separately and the unsaponifiable matter then recovered from each saponified extract. I have found that invariably the first extract contains the lowest ratio of vitamins in relation to the total unsaponifiable matter when compared to the subsequent extracts of the same oil.

In many cases the ratio of vitamin A to the unsaponifiable matter increases successively from the first to the sixth fraction extracted from a given oil. In view thereof, it is preferable, particularly when exceedingly high potent vitamin A concentrates are desired, to saponify each fraction separately. In most cases, however, all of the fractions from the second on may be combined prior to saponification as the first extract appears to contain a much higher ratio of unsaponifiable matter to vitamin A than each of the succeeding fractions. In any event, however, the first fraction will yield a vitamin A concentrate having a higher potency than a concentrate prepared by directly saponifying the same oil. It is possible by the process of the invention to obtain vitamin A concentrates on a commercial scale having a potency of above 3,000,000 units per gram, i. e. essentially pure vitamin A. In order to determine whether or not to saponify the first and subsequent extracts separately or together, it is usually advisable to run laboratory tests on small samples of each extract to determine the ultimate potencies to be expected.

The saponification of the extracts and the recovery of the unsaponifiable material therefrom may be carried out in any suitable manner. In all cases, it is preferred, of course, that the extracts be recovered from the polar solvent solutions thereof before they are saponified. Preferably the saponification of the extracts is carried out by the process of application, Serial No. 333,114 of Buxton and Simons filed May 3, 1940, which has issued as Patent No. 2,318,748, or the process of application, Serial No. 350,166 of Buxton and Colman, filed August 2, 1940, which has issued as Patent No. 2,318,749, since much more efficient recovery of the fat-soluble vitamins will be obtained.

For a fuller understanding of the nature and objects of the invention, reference should be had to the following examples which are given merely to further illustrate the invention and are not to be construed in a limiting sense all parts given being by weight and all vitamin potencies being expressed in U. S. P. units.

*Example I*

100 parts of crude shark liver oil containing 99,000 U. S. P. units of vitamin A per gram were mixed with 400 parts of 99% isopropanol and the mixture warmed to about 35° C. to dissolve the oil. The solution was then cooled gradually to about −25° C. After about 48 hours the upper isopropanol layer was decanted and filtered. The insoluble solidified oil fraction was re-extracted three more times as above. The four isopropanol extracts were combined, filtered and the isopropanol removed by distillation under reduced pressure and in the presence of $N_2$ gas.

100 parts of the combined isopropanol extracts containing 262,000 U. S. P. units of vitamin A per gram were mixed with 50 parts of ethylene dichloride and 3 parts of 99% isopropanol. While stirring in the presence of $N_2$ gas sufficient 45% aqueous KOH (43 grams) to completely saponify the oil was added. After about 20 minutes the stirring was ceased and the resulting thick supersolvented emulsion insulated and allowed to stand at room temperature over-night. The soap-mass was then heated to about 60° C. while stirring in the presence of $N_2$ gas for about 30 minutes to break the emulsion and to flocculate the soap. 400 parts of ethylene dichloride and sufficient water to bring the moisture content of the soap up to about 24% were added and the soap-mass cooled to room temperature. The stirring was stopped and after about 30 minutes the lower solvent layer removed. The flocculated soap particles were then extracted six more times with 400 part portions of ethylene dichloride. The seven ethylene dichloride extracts were combined, filtered and the ethylene dichloride removed by distillation. The recovered vitamin A alcohol concentrate contained 2,400,000 U. S. P. units of vitamin A per gram. A concentrate produced directly from the crude oil by the above saponification process yielded a product containing 1,600,000 U. S. P. units of vitamin A per gram.

*Example II*

100 parts of crude shark liver oil containing 106,000 U. S. P. units of vitamin A per gram were mixed with 4000 parts of 99% isopropanol and the mixture warmed to about 33° C. to dissolve the oil. The solution was then cooled gradually to about −25° C. and after about 24 hours the upper isopropanol layer was decanted and filtered. The insoluble solidified oil layer was re-extracted three more times as above. Each isopropanol extract fraction was freed of isopropanol separately by subjecting the same to distillation under reduced pressure in the presence of $N_2$ gas. The following unsaponifiable and vitamin A values on the crude oil and on the four separate isopropanol extract fractions bring out clearly why unsaponifiable fractions prepared from the second, third and fourth extract fractions are materially more potent in vitamin A than similarly prepared fractions from the crude oil or from the first isopropanol extract fraction.

|  | Unsaponified value | Units vitamin A per gram |
| --- | --- | --- |
| Crude oil | 5.4 | 106,000 |
| First isopropanol extract | 13.0 | 277,000 |
| Second isopropanol extract | 11.0 | 254,000 |
| Third isopropanol extract | 8.8 | 276,000 |
| Fourth isopropanol extract | 8.4 | 242,000 |

20 parts of each of the above samples were completely saponified and the unsaponifiable fraction recovered as described in Example 1. The following vitamin A results were obtained on the unsaponifiable fractions from each of the aforesaid samples.

Units vitamin A per gram on the unsaponifiable

Crude oil _____ 1,500,000
First isopropanol extract _____ 1,570,000
Second isopropanol extract _____ 2,080,000
Third isopropanol extract _____ 2,470,000
Fourth isopropanol extract _____ 2,650,000

It is evident from the above description and examples that the process of the invention provides a highly efficient means for utilizing a fat-soluble vitamin-containing marine oil to the best advantage. Highly potent concentrates of fat-soluble vitamins are obtained, concentrates which are in fact much more potent than those obtained by the usual concentration processes; and in addition, a large percentage of the vitamin-containing oil is left in its original form and not destroyed as with the usual processes. This residual oil usually contains a certain amount of fat-soluble vitamins and may be advantageously employed to supply the vitamin needs of livestock and poultry by admixing the oil with livestock and poultry feeds in the usual manner. In case the vitamin potency of this oil is slightly below that desired for use in farm feeds, it may easily be adjusted to the desired potency with concentrates of the necessary vitamin.

Since certain changes may be made in carrying out the process without departing from the scope of the invention, it is intended that all matter contained in the above description shall be interpreted as illustrative and not in a limiting sense.

Having described my invention, what I claim as new and desire to secure by Letters Patent is:

1. A process of producing an improved fat-soluble vitamin concentrate, which comprises contacting a fat-soluble vitamin-containing marine oil with a solvent selected from the group consisting of aliphatic and alicyclic monohydroxy alcohols containing from 3 to 6 carbon atoms, esters formed by the reacton of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, heating the mass to dissolve at least a major portion of the oil in the solvent, cooling the mass to a temperature within the range of 0° C. to —70° C. whereby layers are formed, separating the solvent-soluble fraction from the mass, saponifying said soluble fraction and recovering the unsaponified matter therefrom.

2. A process of producing an improved fat-soluble vitamin concentrate, which comprises contacting a fat-soluble vitamin-containing marine oil with a solvent selected from the group consisting of aliphatic and alicylic monohydroxy alcohols containing from 3 to 6 carbon atoms, heating the mass to dissolve at least a major portion of the oil in the solution, cooling the mass to a temperature within the range of 0° C. to —70° C. whereby layers are formed, separating the solvent-soluble fraction from the mass, saponifying said soluble fraction and recovering the unsaponified matter therefrom.

3. A process of producing an improved fat-soluble vitamin concentrate, which comprises contacting a fat-soluble vitamin-containing marine oil with isopropanol, heating the mixture to dissolve at least a major portion of the oil in the isopropanol, cooling the mass to a temperature within the range of 0° C. to —70° C. whereby layers are formed, separating the isopropanol-soluble fraction from the mass, saponifying said soluble fraction and recovering the unsaponified matter therefrom.

4. A process of producing an improved fat-soluble vitamin concentrate, which comprises contacting a fat-soluble vitamin-containing marine oil with diacetone alcohol, heating the mixture to dissolve at least a major portion of the oil in the diacetone alcohol, cooling the mass to a temperature within the range of 0° C. to —70° C. whereby layers are formed, separating the diacetone alcohol-soluble fraction from the mass, saponifying said soluble fraction and recovering the unsaponified matter therefrom.

5. A process of producing an improved fat-soluble vitamin concentrate, which comprises contacting a fat-soluble vitamin-containing marine oil with aqueous acetone, heating the mixture to dissolve at least a major portion of the oil in the aqueous acetone, cooling the mass to a temperature within the range of 0° C. to —70° C. whereby layers are formed, separating the aqueous acetone-soluble fraction from the mass, saponifying said soluble fraction and recovering the unsaponified matter therefrom.

6. A process of producing an improved fat-soluble vitamin concentrate, which comprises contacting a fat-soluble vitamin-containing marine oil with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, heating the mass to dissolve at least a major portion of the oil in the solvent, cooling the mass to a temperature within the range of 0° C. to —70° C. whereby layers are formed, separating the solvent-soluble fraction from the mass, re-extracting at least twice more the solvent-insoluble fraction as above, saponifying said soluble fractions and recovering the unsaponified matter therefrom.

7. A process of producing an improved fat-soluble vitamin concentrate, which comprises contacting a fat-soluble vitamin-containing marine oil with a solvent selected from the group consisting of aliphatic and alicyclic monohydroxy alcohols containing from 3 to 6 carbon atoms, heating the mass to dissolve at least a major portion of the oil in the solution, cooling the mass to a temperature within the range of 0° C. to —70° C. whereby layers are formed, separating the solvent-soluble fraction from the mass, re-extracting at least twice more the solvent-insoluble fraction as above, saponifying said soluble fractions and recovering the unsaponified matter therefrom.

8. A process of producing an improved fat-soluble vitamin concentrate, which comprises contacting a fat-soluble vitamin-containing marine oil with isopropanol, heating the mixture to dissolve at least a major portion of the oil in the isopropanol, cooling the mass to a temperature within the range of 0° C. to —70° C. whereby layers are formed, separating the isopropanol-soluble fraction from the mass, re-extracting at least twice more the isopropanol-insoluble fraction as above, saponifying said soluble fractions and recovering the unsaponified matter therefrom.

9. A process of producing an improved fat-soluble vitamin concentrate, which comprises contacting a fat-soluble vitamin-containing marine oil with diacetone alcohol, heating the mixture to dissolve at least a major portion of the oil in the diacetone alcohol, cooling the mass to a temperature within the range of 0° C. to —70° C. whereby layers are formed, separating the diacetone alcohol-soluble fraction from the mass, re-extracting at least twice more the diacetone alcohol-insoluble fraction as above, saponifying said soluble fractions and recovering the unsaponified matter therefrom.

10. A process of producing an improved fat-soluble vitamin concentrate, which comprises contacting a fat-soluble vitamin-containing marine oil with aqueous acetone, heating the mixture to dissolve at least a major portion of the oil in the aqueous acetone, cooling the mass to a temperature within the range of 0° C. to —70° C. whereby layers are formed, separating the aqueous acetone-soluble fraction from the mass, re-extracting at least twice more the aqueous acetone-insoluble fraction as above, saponifying said soluble fractions and recovering the unsaponified matter therefrom.

LORAN OID BUXTON.